United States Patent
Ashby et al.

(10) Patent No.: US 9,590,880 B2
(45) Date of Patent: Mar. 7, 2017

(54) DYNAMIC COLLECTION ANALYSIS AND REPORTING OF TELEMETRY DATA

(71) Applicant: Microsoft Corporation, Redmond, WA (US)

(72) Inventors: Erik Ashby, Bellevue, WA (US); Eric Smith, Seattle, WA (US); George Arthur Herbert, III, Kirkland, WA (US); Danny Thayer, Duvall, WA (US); Bruce Wiedeman, Kirkland, WA (US); Larry Jack Israel, Bellevue, WA (US); Robert Novitskey, Redmond, WA (US); Peter Gurevich, Woodinville, WA (US); Mukunda Murthy, Kirkland, WA (US); Jacob Pitts, Bellevue, WA (US); Eric Borzello, Redmond, WA (US); Yi-Lei Wu, Redmond, WA (US); Bala Murali Loganath, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 221 days.

(21) Appl. No.: 13/961,641

(22) Filed: Aug. 7, 2013

(65) Prior Publication Data

US 2015/0046512 A1    Feb. 12, 2015

(51) Int. Cl.
*H04L 12/26* (2006.01)
*H04Q 9/00* (2006.01)

(52) U.S. Cl.
CPC ............. *H04L 43/08* (2013.01); *H04Q 9/00* (2013.01)

(58) Field of Classification Search
CPC ............. H04L 43/08; H04L 29/06047; H04L 29/08162; H04L 29/08225;
(Continued)

(56) References Cited

U.S. PATENT DOCUMENTS 7,380,172 B2    5/2008  Srinivas et al.
8,413,247 B2    4/2013  Hudis et al.
(Continued)

FOREIGN PATENT DOCUMENTS

GB    2472977 A    3/2011
WO    2012098602 A1    7/2012

OTHER PUBLICATIONS

Coriani, Silvano, "Windows Azure: Telemetry Basics and Troubleshooting", Retrieved at: <<http://social.technet.microsoft.com/wiki/contents/articles/18146.windows-azure-telemetry-basics-and-troubleshooting.aspx>>, Jun. 28, 2013, pp. 7.
Dennison, Randy, "SCADA System Assessment", Retrieved at: <<http://www.epgco.com/scada-system-assessment.html>>, Dec. 15, 2004, pp. 9.
"Collecting Telemetry Data from Your Apps", Retrieved at: <<http://msdn.microsoft.com/en-us/library/windows/apps/hh967787.aspx>>, Jun. 8, 2012, p. 1.
(Continued)

*Primary Examiner* — Wing F Chan
*Assistant Examiner* — Billy H Ng
(74) *Attorney, Agent, or Firm* — Anand Gupta; Tom Wong; Micky Minhas

(57) ABSTRACT

Technologies are generally described for collecting, analyzing and reporting telemetry data. A telemetry engine is built into a client application installed on a client device, and the telemetry engine is configured to collect and analyze application data at the client device and report the analyzed data to a service provider associated with the application. The telemetry application includes a specialized set of components, such as a telemetry transport component configured to communicate with the service provider, a data collection module configured to retrieve data from the application, and a rule manager and analyzer configured to analyze collected data according to a set of data collection rules provided by the service provider. The telemetry engine enables collection and analysis of telemetry data from multiple distributed client devices. The client devices dynamically change over time to ensure that current and important information is reported to the service provider.

9 Claims, 6 Drawing Sheets

(58) Field of Classification Search
CPC ........... H04L 29/08522; H04L 29/0872; H04L 67/1002; H04L 67/1091; H04L 67/42; H04Q 9/00
See application file for complete search history.

(56) References Cited

U.S. PATENT DOCUMENTS

| 8,639,989 | B1* | 1/2014 | Sorenson, III | H04L 63/08 709/224 |
|---|---|---|---|---|
| 2007/0268128 | A1* | 11/2007 | Swanson et al. | 340/539.22 |
| 2011/0173496 | A1 | 7/2011 | Hosek et al. | |
| 2012/0239739 | A1* | 9/2012 | Manglik | G06F 9/5077 709/203 |
| 2013/0238785 | A1* | 9/2013 | Hawk | G06F 9/5072 709/224 |
| 2013/0285837 | A1* | 10/2013 | Uchida | 340/870.02 |
| 2014/0066052 | A1* | 3/2014 | Chang | H04L 43/08 455/423 |

OTHER PUBLICATIONS

Adams, et al., "An Introduction to Designing Reliable Cloud Services", Retrieved at: <<http://download.microsoft.com/download/5/9/3/59382FDF-93C6-45BC-8A58-C98131D6C402/An%20Introduction%20to%20Designing%20Reliable%20Cloud%20Services-FINAL0.pdf>>, Sep. 2012, pp. 25.

"Application Analytics: What Every Developer Should Know", Retrieved at: <<http://msdn.microsoft.com/en-us/library/jj620913.aspx>>, Jul. 2012, pp. 15.

"Second Written Opinion Issued in PCT Application No. PCT/US2014/049520", Mailed Date: Jul. 3, 2015, 6 Pages.

"International Search Report & Written Opinion Received for PCT Application No. PCT/US2014/049520", Mailed Date Oct. 31, 2014, 12 Pages.

* cited by examiner

DYNAMIC COLLECTION ANALYSIS AND REPORTING OF TELEMETRY DATA

BACKGROUND

In order to detect, diagnose and fix problems with a local application installed on local client devices, a service provider, such as a software provider, may need to log and analyze activity, performance and a state of the application across a single client device and across multiple distributed client devices. Local applications can generate a large amount of raw data, which may be transmitted over a network to the service provider to enable analysis of the data at the service provider. Retrieving large amounts of data over the network may consume valuable server and network resources and may overly burden the server when collecting data from large numbers of applications. Additionally, a service provider may need to install separate tools on the client devices to facilitate data monitoring and analysis. Direct interaction with the client devices may also be necessary to collect and analyze data. Furthermore, application data may continuously change over time, which may compound the difficulties of collecting and monitoring data of applications across a large number of distributed client devices.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a telemetry engine configured to facilitate collection and analysis of dynamic telemetry data at a client application. The analyzed telemetry data may be reported to a remote service provider enable the service provider to detect and diagnose issues with an application. The telemetry engine may be integrated into a client application installed on a client device, and the telemetry engine may include separate components, such as a telemetry transport component configured to communicate with the service provider, a data collection module configured to retrieve data from the application, and a rule manager and analyzer configured to analyze collected data according to a set of data collection rules provided by the service provider.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
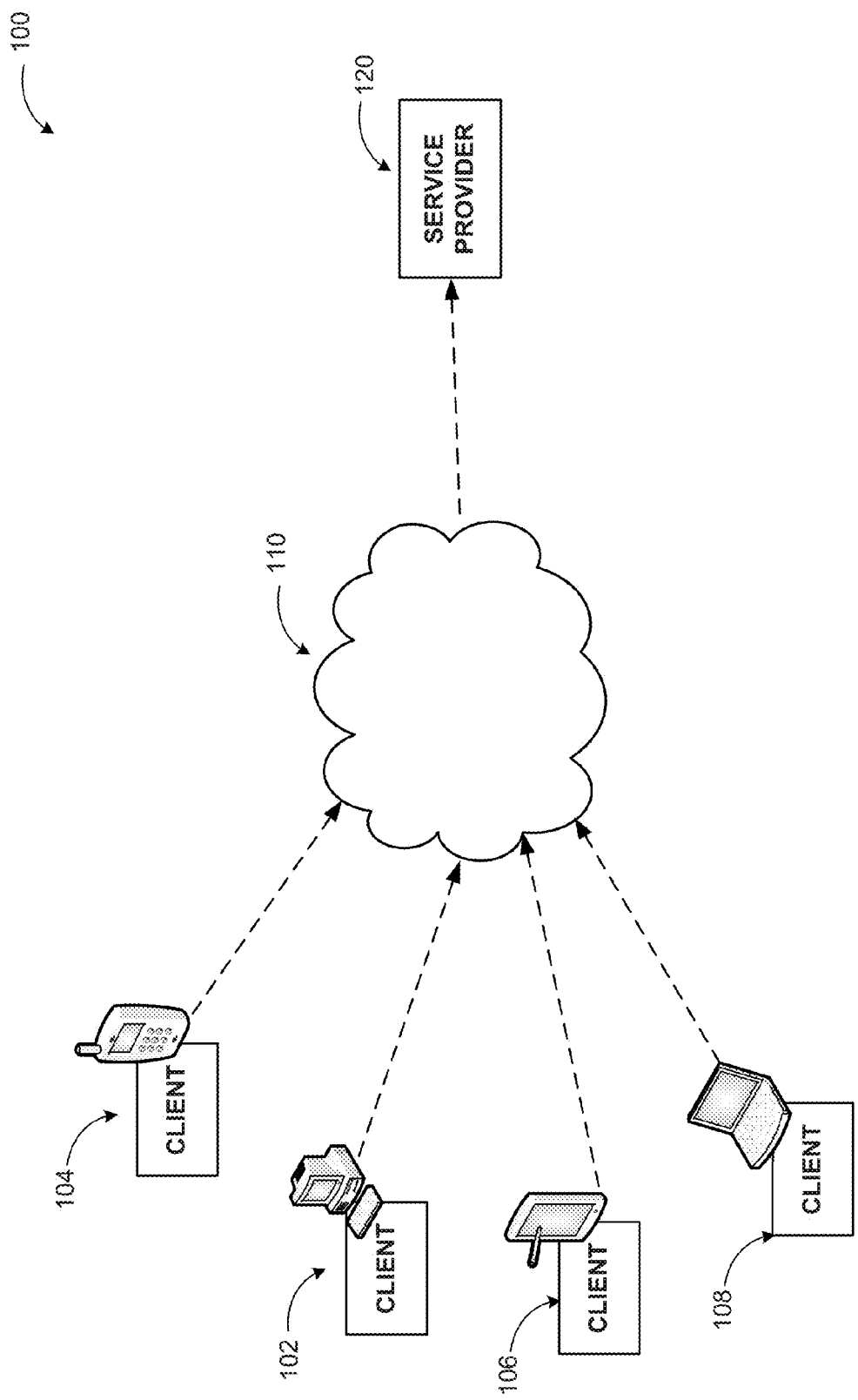
FIG. 1 illustrates an example environment where collecting and analyzing telemetry data at a local client may be employed.

As briefly described above, a telemetry engine is provided to facilitate collecting and analyzing dynamic telemetry data at a client application and reporting the analyzed telemetry data to a remote service provider. The telemetry engine may be integrated into a client application installed on a client device. The telemetry application may include a specialized set of components, such as a telemetry transport component configured to communicate with the service provider, a data collection module configured to retrieve data from the application, and a rule manager and analyzer configured to analyze collected data according to a set of data collection rules provided by the service provider. Multiple telemetry engines integrated with multiple distributed applications may enable collection and analysis of telemetry data from multiple distributed client devices. The client devices may dynamically change over time to ensure that current and important telemetry data and application information is reported to the service provider to enable the service provider to detect and diagnose issues with an application.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

FIG. 1 illustrates an example environment where collecting and analyzing telemetry data at a local client may be employed, according to some embodiments herein.

Diagram 100 illustrates some example client devices that may host applications where telemetry data may be retrieved and analyzed. Example client devices may include a desktop computer 102, a laptop computer 108, a smart phone 104, a tablet 102, and other similar devices where applications may be executed. In an example embodiment, a service provider 120, such as a software provider, associated with the application may desire to monitor and collect data associated with an activity, a performance and a state of an application executed on one or more of the client devices (102, 104, 106, 108).

The service provider 120 may also monitor application data across a large number of client devices associated with many different users in order to detect, diagnose, and fix issues associated with the application. The service provider 120 may access data associated with the application remotely over a network 110, such as a cloud based network. Because the service provider 120 may be remote, it may be difficult to monitor, retrieve and store a large amount of raw application data from multiple client devices over the network. For example, the service provider 120 may retrieve large amounts of raw application data from multiple client devices over the network in order to process the data to detect and diagnose problems with the application. Exchanging large amounts of raw data from multiple clients over a network may be very inefficient and may consume valuable network and server resources. Additionally, in order to address problems or issues associated with the application, the service provider 120 may need to deploy separate tools over the network to the client device(s) executing the application. Direct access and manual interaction with the client device may also be required in order to detect, diagnose, and repair application issues, which can be inconvenient and inefficient since the service provider 120 may monitor a large number of applications distributed across many locations.

In a system according to embodiments, the service provider 120 may provide a telemetry engine associated with an application installed on a client device in order to perform data retrieval and analysis of the application executed at the client device. Telemetry may refer to a process of collecting and measuring data from remote sources. The telemetry engine may be integrated with an application installed on the client device, such that the telemetry engine may dynamically perform data retrieval and analysis at the client device, and the analyzed data may be provided to the service provider 120. The service provider 120 may provide instructions to the telemetry engine for what types of data to collect and analyze. The telemetry engine may be configured to collect the requested data, analyze the data, and provide a data analysis report to the service provider 120 over the network 110. After receiving the data analysis report, the service provider 120 may efficiently implement processes to address application issues detected in the data analysis report, such as providing a patch to fix an application problem over the network to the client application. The telemetry engine may also enable the service provider 204 to collect telemetry data from applications executed on a large number distributed client devices that can dynamically change over time in order to ensure that current and important information is reported. The telemetry engine 206 may enable collection of the application data without installation of separate tools or applications, or manual actions taking place on individual client devices.

Figure 2:
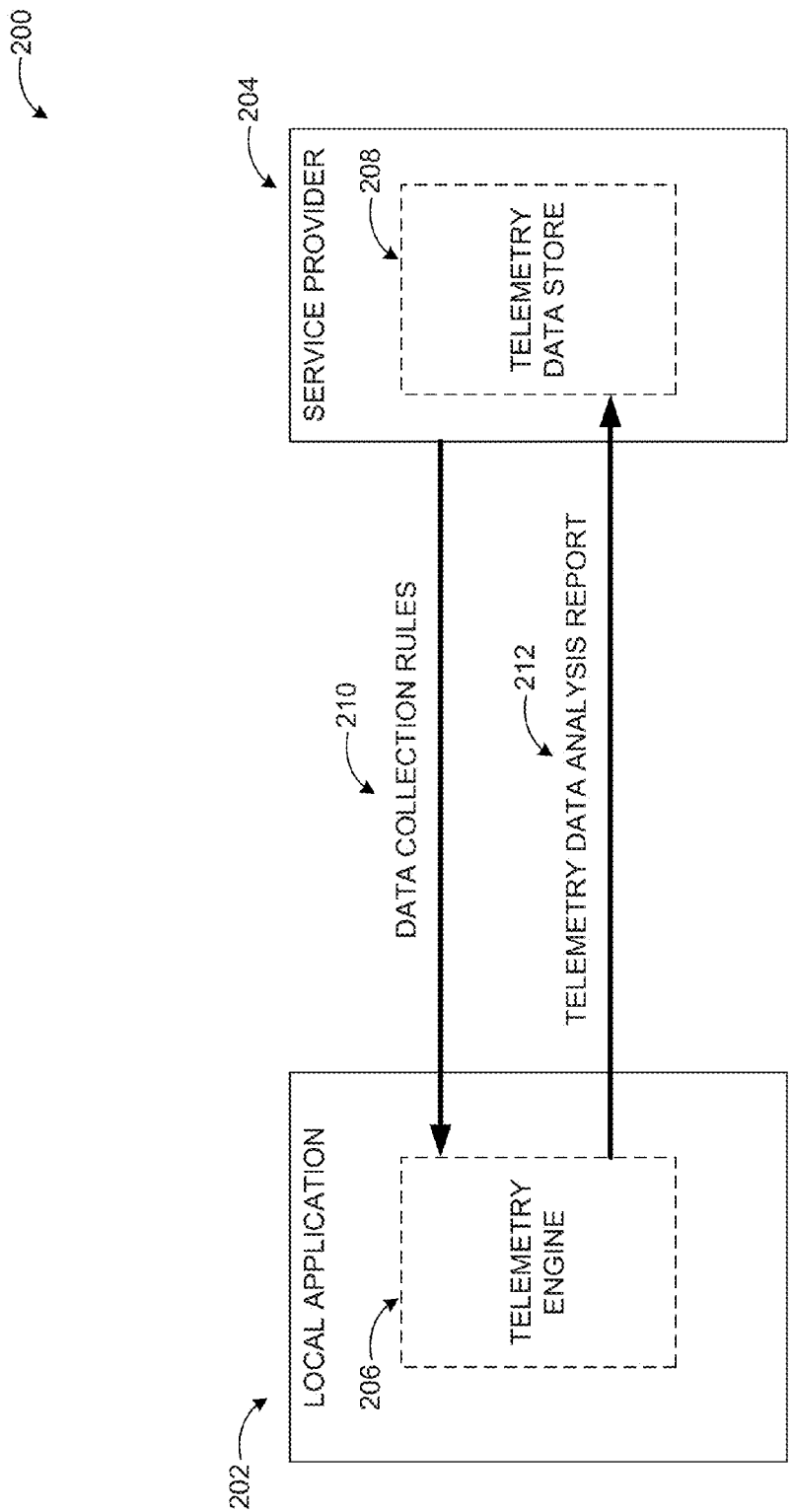
FIG. 2 illustrates example telemetry data collection and analysis at a local client and providing analyzed telemetry data to a service provider.

FIG. 2 illustrates example telemetry data collection and analysis at a local client and providing analyzed telemetry data to a service provider, according to some embodiments herein.

Diagram 200 illustrates a dynamic telemetry engine 206 that may be integrated with a local application 202 executed on a client device. The telemetry engine 206 may be responsible for dynamic collection, analysis, and reporting of data from the local application, such as log data, event data, performance data, and state data to a service provider 204.

In an example embodiment, the telemetry engine 206 may receive instructions, which may be data collection rules 210, from the service provider 204. The telemetry engine 206 may filter through raw application data to collect data requested in the data collection rules 210, and may perform analysis of the raw data to analyze the data according to the data collection rules 210. After performing the analysis according to the data collection rules 210, the telemetry engine 206 may generate a data analysis report 212, and may provide the data analysis report 212 to the service provider 204. The service provider 204 may store the received data analysis report 212 in a telemetry data store 208 where data reports from multiple distributed applications and client devices may be stored and managed. For example, the service provider 204 may provide data collection rules 210 to multiple client devices executing applications integrated with a telemetry engine, and the service provider 204 may receive multiple data analysis reports across the multiple devices from each telemetry engine.

In an example scenario, the telemetry engine 206 may enable a software provider to identify and respond to a detected application problem on a client device, such as if the application has started to run slow when performing 'X' operation on the client device. The software provider may define a set of rules that may instruct a telemetry engine associated with the installed application to collect, monitor and analyze specific performance data about the 'X' operation. The telemetry engine 206 may respond to the rule set by: collecting specific raw application data about 'X' operation, performing an analysis of the data according to the rules (such as determining an average, maximum, minimum, count, or similar analysis), identifying a problem when the 'X' operation is running slower than expected, automatically collecting any diagnostic information and data about the problem from the application, and reporting back to the software provider specific data about the problem related to the 'X' operation. This example scenario may be performed across many different client devices without manual interaction or installation of separate diagnostic tools in order to detect and diagnose the application issue across multiple client devices.

Figure 3:
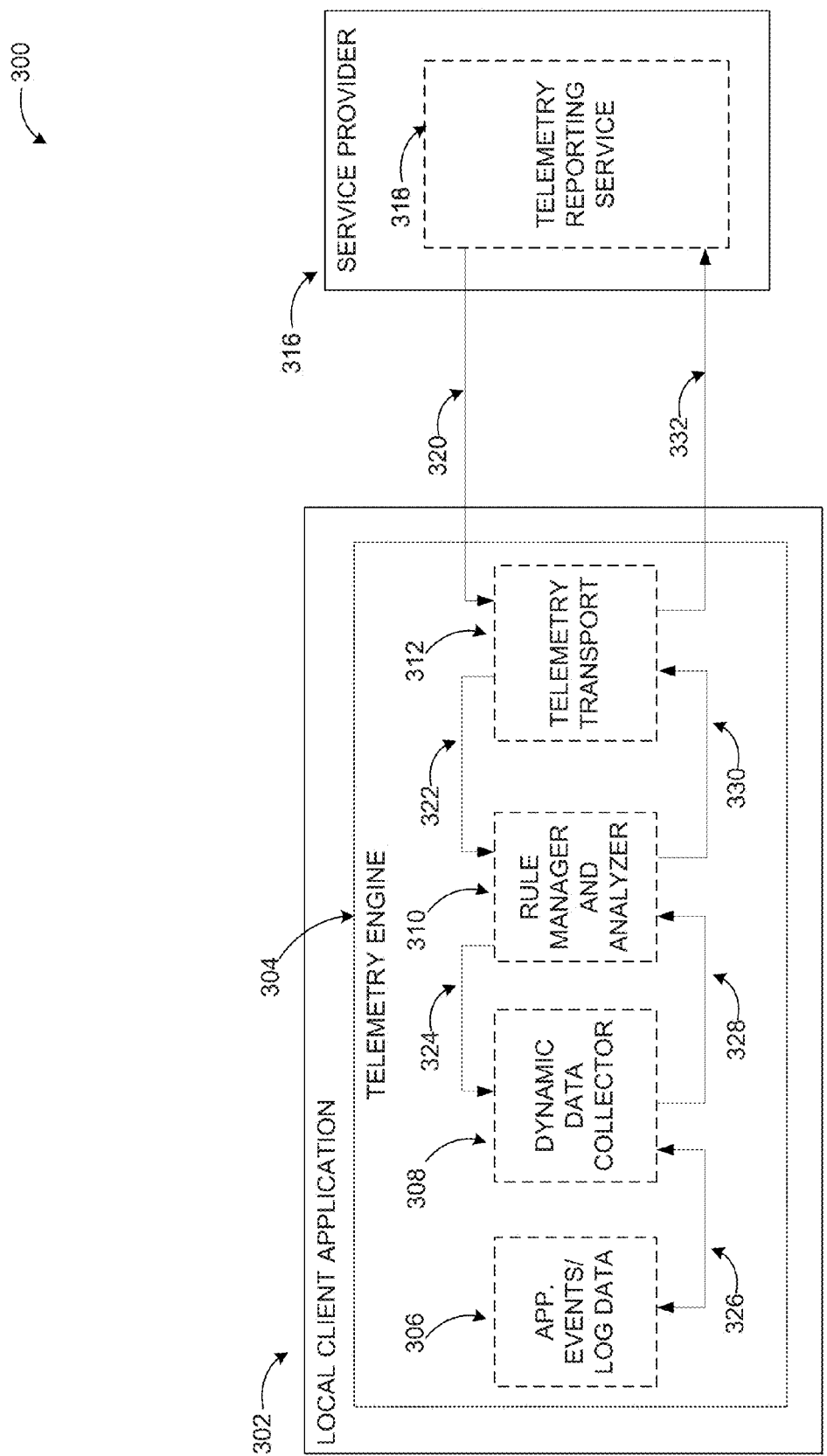
FIG. 3 illustrates example data collection and analysis components of a telemetry engine.

FIG. 3 illustrates example data collection and analysis modules of a telemetry engine, according to some embodiments herein.

As illustrated in diagram 300, a telemetry engine 304 installed on a client device may facilitate data collection, analysis, and reporting to a service provider 316 over a network. The telemetry engine 304 may be integrated with a local application 302 installed on one or more client devices, such that the telemetry engine 304 may not require separate installation and execution, but may be configured to continuously monitor the application data in the background as the application 302 is executed.

In a system according to embodiments, the telemetry engine 304 may include one or more separate modules to facilitate data collection, analysis and reporting to the service provider. Example modules of the telemetry engine may include a dynamic data collector 308, a rule manager and analyzer 310, and a telemetry transport 312. The telemetry transport 312 may be configured to communicate with the service provider 316 to receive a telemetry rule set, which may include instructions for what type of telemetry data to collect from the application, and what type of data analysis to perform. The telemetry transport 312 may also report analyzed data back to the service provider 316.

The rule manager and analyzer 310 may be responsible for processing the received telemetry rule set from the telemetry transport 312 to determine what data to collect and analyze. The rule manager and analyzer 310 may communicate instructions for what data needs to be collected to the dynamic data collector 308. The instructions from the rule manager and analyzer 310 may define what information should be collected, and may also define a set of operating conditions for when data should be collected, so that the dynamic data collector 308 may pre-filter captured raw application data to retrieve data relevant to the service provider instructions. The dynamic data collector 308 may pre-filter the collected raw application data, such as event and logging data, from the application 302 based on the data collection instructions from the rule manager and analyzer 310. The rule manager and analyzer 310 may also enable a dynamic ability to change what data is collected based on data collection instructions and changing operating conditions.

The rule manager and analyzer 310 may receive the pre-filtered data from the dynamic data collector 308, and may apply logic to perform additional filtering and data analysis. The rule manager and analyzer 310 may also be configured to manage the collected data and to perform data analysis on the collected data, including performing calculations, summarizations, and logic on collected data. The rule manager and analyzer 310 may generate a data analysis report, and may provide the report back to the telemetry transport 312, which may in turn provide the report to the service provider 316

In an example scenario for collecting and analyzing data at the telemetry engine 304, the telemetry transport 312 may periodically communicate with the service provider 316, and may receive 320 a set of telemetry rules from the service provider 316. The telemetry rules may define what information to collect and report from the application 302. For example, the service provider 316 may identify a collaboration application at a client device, and may instruct the telemetry transport 312 to collect particular operating information associated with the collaboration application.

The rule manager and analyzer 310 may process 322 the received telemetry rules and may determine specific application data, such as event and log data, to be collected according to the telemetry rules. For example, the rule manager and analyzer 310 may determine that particular data points associated with the application need to be collected, an average of the data points over a defined period of time needs to be calculated, and the results need to be reported back to the service provider 316.

The rule manager and analyzer 310 may provide 324 instructions to the dynamic data collector 308 on telemetry data to retrieve from collected raw data so that dynamic data collector 308 may pre-filter the raw data to collect the requested telemetry data according to the telemetry rules. The dynamic data collector 308 may provide 328 the filtered telemetry data to the rule manager and analyzer 310. Upon receipt of the filtered telemetry data, the rule manager and analyzer 310 may automatically analyze the filtered telemetry data according to the telemetry rules, and may report 330 the data analysis results to the telemetry transport 312. The telemetry transport 312 may report 332 the data analysis back to the service provider 316 for an action to be taken.

In a further embodiment, the service provider 316 may monitor an application executed on multiple different client devices, and may receive data analysis reports from multiple telemetry engines executed on the multiple client devices. The service provider 316 may store a plurality of received analysis reports at a telemetry reporting service 318, where the service provider 316 may manage and further analyze telemetry data associated with multiple client applications. The service provider 316 may select a cluster of client devices having a particular problem or issue, and may send telemetry rule sets to the identified cluster of client devices based on detected issues. Additionally, the telemetry engine 304 may provide metadata associated with a client device to the service provider 316, so that service provider 316 may determine data collection rules and instructions to provide based on particular metadata. For example, the service provider 316 may target a group of client devices from which to collect data, such as collecting data from users executing a certain type of application, or running the application on a particular device, such as a tablet or smartphone, for example.

Figure 4:
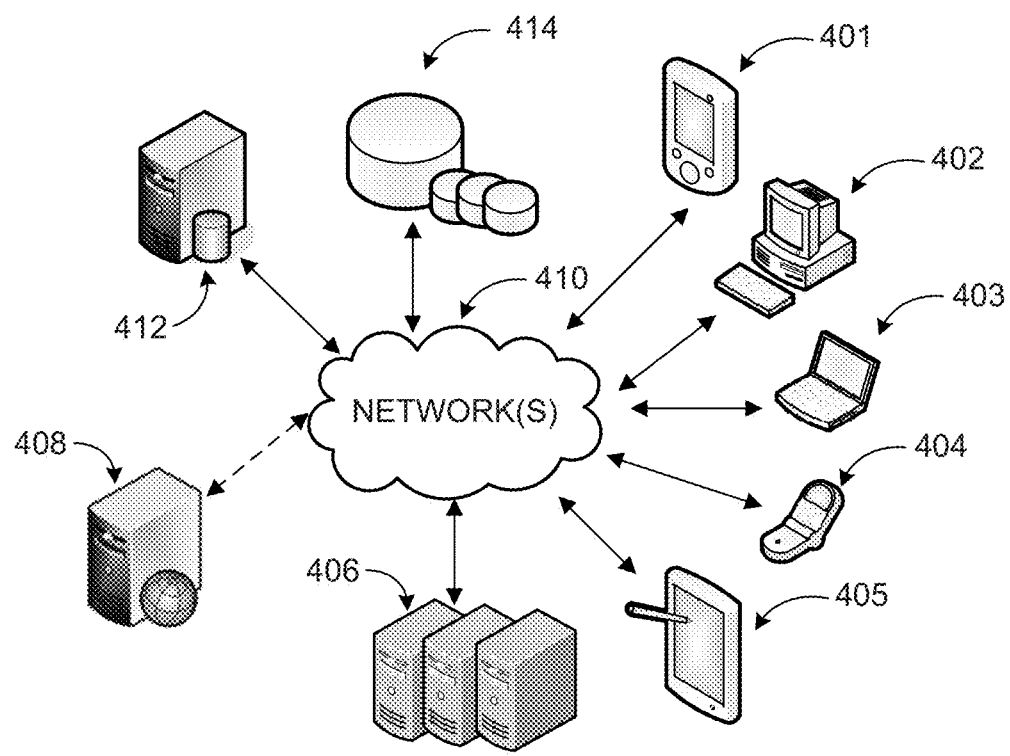
FIG. 4 is a networked environment, where a system according to embodiments may be implemented.

The example applications, devices, and modules, depicted in FIGS. 1-3 are provided for illustration purposes only. Embodiments are not limited to the configurations and content shown in the example diagrams, and may be implemented using other engines, client applications, service providers, and modules employing the principles described herein FIG. 4 is an example networked environment, where embodiments may be implemented. In addition to locally installed applications, such as application 522 discussed below, a telemetry engine may also be employed in conjunction with hosted applications and services that may be implemented via software executed over one or more servers 406 or individual server 408. A hosted service or application may communicate with client applications on individual computing devices such as a handheld computer 401, a desktop computer 402, a laptop computer 403, a smart phone 404, a tablet computer (or slate), 405 ('client devices') through network(s) 410 and control a user interface presented to users.

Client devices 401-405 are used to access the functionality provided by the hosted service or application. One or more of the servers 406 or server 408 may be used to provide a variety of services as discussed above. Relevant data may be stored in one or more data stores (e.g. data store 414), which may be managed by any one of the servers 406 or by database server 412.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to provide a telemetry engine for data collection and analysis. Furthermore, the networked environments discussed in FIG. 4 are for illustration purposes only. Embodiments are not limited to the example applications, modules, or processes.

Figure 5:
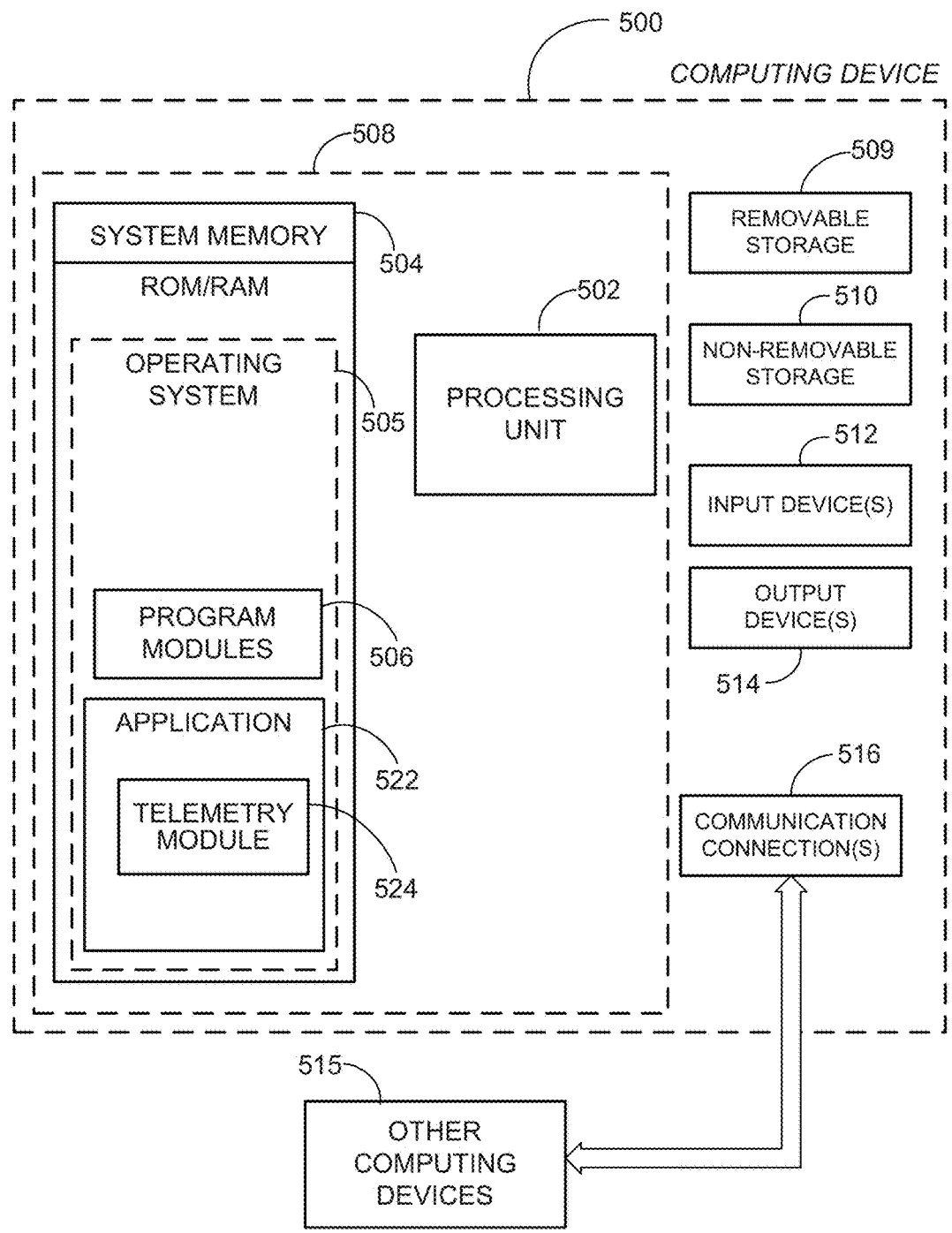
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any touch and/or gesture enabled device in stationary, mobile, or other form such as the example devices discussed in conjunction with FIGS. 1-3 and may include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 508 suitable for controlling the operation of the platform, such as the WINDOWS®, WINDOWS MOBILE®, or WINDOWS PHONE® operating systems from MICROSOFT CORPORATION of Redmond, Wash. The system memory 504 may also include one or more software applications such as program modules 506, application 522 and telemetry module 524.

Telemetry module 524 may operate in conjunction with the operating system 508 or application 522 to collect, analyze and report data analyses to a service provider based on data collection rules provided by the service provider. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, an optical capture device for detecting gestures, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 515, such as over a wireless network in a distributed computing environment, a satellite link, a cellular link, and comparable mechanisms. Other devices 515 may include computer device(s) that execute communication applications, other directory or policy servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
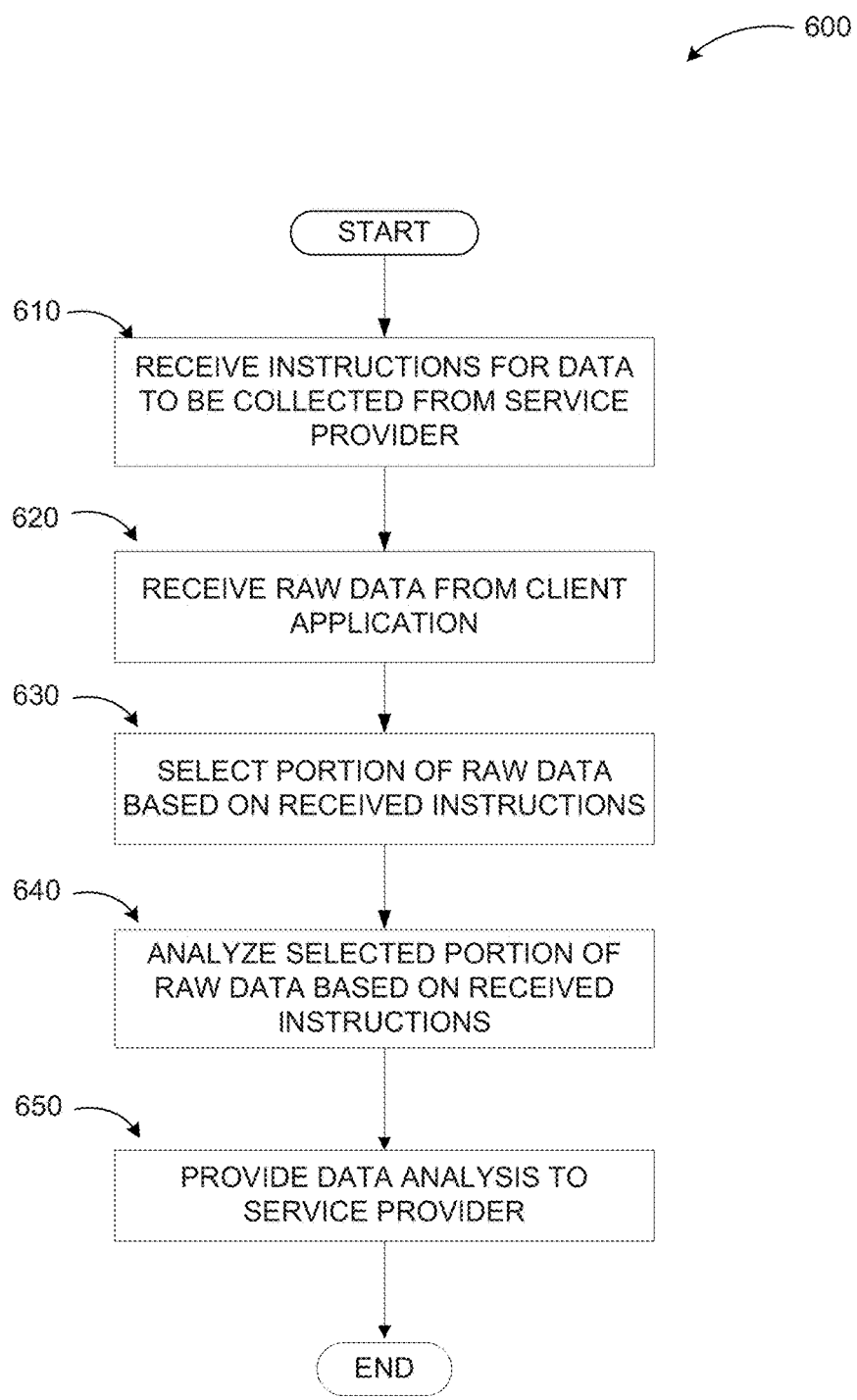
FIG. 6 illustrates a logic flow diagram for a process of collecting, analyzing, and reporting telemetry data from a local client application to a remote service, according to embodiments.

FIG. 6 illustrates a logic flow diagram for a process of collecting, analyzing, and reporting telemetry data from a local client to a remote service, according to embodiments. Process 600 may be implemented as part of an application or an operating system.

Process 600 begins with operation 610, "RECEIVE INSTRUCTIONS FOR DATA TO BE COLLECTED FROM A SERVICE PROVIDER," where a telemetry engine integrated with an application installed on a local client device may receive instructions from a service provider to collect and analyze application data. A telemetry transport module as part of the telemetry engine may receive the instructions from the service provider, and the instructions may include data collection rules including what types of data to collect and conditions under which to collect data.

Operation 610 may be followed by operation 620, "RECEIVE RAW DATA FROM APPLICATION," where raw application data may be collected at a data collector module of the telemetry engine. Operation 620 may be followed by operation 630, "SELECT PORTION OF RAW DATA BASED ON RECEIVED INSTRUCTIONS," where the raw data may be filtered to select a portion of the raw data based on the instructions from the service provider. A rule manager and analyzer module of the telemetry engine may process the received instructions to determine the data to be collected, and may instruct the data collector to filter the collected raw data to retrieve the requested data from the collected raw data.

Operation 630 may be followed by operation 640, "ANALYZE SELECTED PORTION OF RAW DATA BASED ON RECEIVED INSTRUCTIONS." where the rule manager and analyzer module may analyze the selected portion of raw data based on the instructions, including performing any calculations, summarizations and logic on collected data.

Operation 640 may be followed by operation 650, "PROVIDE DATA ANALYSIS TO SERVICE PROVIDER," the rule manager and analyzer module may provide a report of the data analysis to the telemetry transport module, and the telemetry transport module may provide the report to the service provider.

The operations included in process 600 are for illustration purposes. Collecting, analyzing, and reporting telemetry data from a local client to a remote service according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to process telemetry data at a client application, the method comprising:
    by a telemetry engine of the client application being executed by a client device:
        receiving instructions associated with data to be analyzed at the client application;
        retrieving raw data associated with operations of the client application;
        processing the instructions and selecting a portion of the raw data based on the instructions, wherein the portion of the raw data includes log data, event data, and state data associated with a slow performance of one of the operations of the client application;
        processing a received set of rules at a rule manager and analyzer component of the telemetry engine to determine a set of data points to retrieve from the client application;
        enabling a data collector component at the rule manager and analyzer component to filter the set of data points from the raw data;
        analyzing the set of data points from the data collector component at the rule manager and analyzer component of the telemetry engine based on the instructions, wherein the analysis includes a calculation, a summarization, and a logic operation executed on the set of data points; and
        providing results of the analysis, the results of the analysis including diagnostic information associated with the slow performance of one of the operations of the client application, as telemetry data and metadata associated with the client device to a service provider such that the service provider is enabled to target a group of client devices by type and select a group of client applications to collect data from based on the metadata.

2. The method of claim 1, wherein receiving the instructions comprises:
    receiving the set of rules from the service provider, the set of rules including a type of data to be collected and a type of data analysis to be performed at the telemetry engine.

3. The method of claim 2, further comprising:
    receiving the set of rules from the service provider at a telemetry transport component of the telemetry engine.

4. The method of claim 1, further comprising:
    providing the results of the analysis to a telemetry transport component, the telemetry transport component being configured to provide a data analysis report to the service provider.

5. The method of claim 1, further comprising:
    capturing events associated with the client application based on the instructions.

6. A computing device to process telemetry data at a client application, the computing device comprising:
    a memory;
    a processor coupled to the memory, the processor executing an application and a telemetry engine integrated with the application, wherein the processor is configured to:
        receive, from a service provider at a telemetry transport component of the telemetry engine, instructions associated with data to be analyzed at the application, the instructions including a set of rules defining a type of data to be collected and a type of data analysis to be performed at the telemetry engine;
        retrieve raw data associated with operations of the client application;
        process the instructions and select a portion of the raw data based on the instructions, wherein the portion of the raw data includes log data, event data, and state data associated with a slow performance of one of the operations of the client application;
        process a received set of rules at a rule manager and analyzer component of the telemetry engine to determine a set of data points to retrieve from the client application;
        enable a data collector component at the rule manager and analyzer component to filter the set of data points from the raw data;
        analyze the set of data points from the data collector component at the rule manager and analyzer component of the telemetry engine based on the instructions, wherein the analysis includes a calculation, a summarization, and a logic operation executed on the set of data points; and
        provide results of the analysis, the results of the analysis including diagnostic information associated with the slow performance of one of the operations of the client application, as telemetry data and metadata associated with the computing device to the service provider such that the service provider is enabled to target a group of client devices by type and select a group of client applications to collect data from used on the metadata.

7. The computing device of claim 6, wherein the processor is further configured to:
    provide the results of the data analysis to the telemetry transport component, wherein the telemetry transport component is configured to provide a data analysis report to the service provider.

8. A computer-readable memory device with instructions stored thereon to process telemetry data at a client application, the instructions including:
    a telemetry engine integrated with the client application;
        receiving data collection instructions from a service provider at a telemetry transport component of the telemetry engine associated with data to be analyzed at the client application, the data collection instructions including a set of rules defining a type of data to be collected and a type of data analysis to be performed;

retrieving raw data associated with operations of the client application at a data collector component of the telemetry engine, wherein the raw data includes log data, event data, and state data associated with a slow performance of one of the operations of the client application;

processing the data collection instructions and selecting one or more data points from the raw data based on the data collection instructions;

processing a received set of rules at a rule manager and analyzer component of the telemetry engine to determine a set of data points to retrieve from the client application;

enabling a data collector component at the rule manager and analyzer component to filter the set of data from the raw data;

analyzing the set of data points from the data collector component at the rule manager and analyzer component of the telemetry engine based on the data collection instructions, wherein the analysis includes a calculation, a summarization, and a logic operation executed on the set of data points; and providing a report including results of the analysis and metadata associated with a client device, the results of the analysis including diagnostic information associated with the slow performance of one of the operations of the client application, to the service provider such that the service provider is enabled to target a group of client devices by type and select a group of client applications to collect data from based on the metadata.

9. The computer-readable memory device of claim 8, wherein the telemetry engine is integrated as a module of the client application, the client application installed on a client device including one or more of: a personal computer, a laptop computer, a tablet, and a smart phone.

* * * * *